(12) United States Patent  
Matukawa et al.

(10) Patent No.: US 11,591,148 B2  
(45) Date of Patent: Feb. 28, 2023

(54) LIQUID REPELLENT FILM OR SHEET, AND PACKAGING MATERTAL, USING SAME

(71) Applicant: DAIWA CAN COMPANY, Tokyo (JP)

(72) Inventors: Yosihiko Matukawa, Kanagawa (JP); Shinichirou Kanamori, Kanagawa (JP); Kana Hashimoto, Kanagawa (JP); Seimei Shiratori, Kanagawa (JP); Koji Fujimoto, Kanagawa (JP); Yoshio Hotta, Kanagawa (JP); Atsushi Kido, Osaka (JP); Mitsunobu Kobayashi, Osaka (JP)

(73) Assignee: DAIWA CAN COMPANY, Tokyo (JP)

( * ) Notice: Subject to any disclaimer, the term of this patent is extended or adjusted under 35 U.S.C. 154(b) by 0 days.

(21) Appl. No.: 17/279,690

(22) PCT Filed: Aug. 30, 2019

(86) PCT No.: PCT/JP2019/034289  
§ 371 (c)(1),  
(2) Date: Mar. 25, 2021

(87) PCT Pub. No.: WO2020/066463  
PCT Pub. Date: Apr. 2, 2020

(65) Prior Publication Data  
US 2022/0033156 A1 Feb. 3, 2022

(30) Foreign Application Priority Data  
Sep. 27, 2018 (JP) ............................. JP2018-182147

(51) Int. Cl.  
*B65D 65/40* (2006.01)  
*B32B 1/00* (2006.01)  
(Continued)

(52) U.S. Cl.  
CPC ................ *B65D 65/40* (2013.01); *B32B 1/00* (2013.01); *B32B 7/12* (2013.01); *B32B 27/08* (2013.01);  
(Continued)

(58) Field of Classification Search  
CPC .. B65D 65/40; B32B 1/00; B32B 7/12; B32B 27/08; B32B 27/20; B32B 27/30;  
(Continued)

(56) References Cited

U.S. PATENT DOCUMENTS

| 2012/0118886 A1 | 5/2012 | Sekiguchi et al. |
| 2015/0017334 A1 | 1/2015 | Sekiguchi et al. |
| 2015/0314554 A1* | 11/2015 | Fujiwara ................ B29C 71/04 428/142 |

FOREIGN PATENT DOCUMENTS

| EP | 0903389 A1 | 3/1999 |
| EP | 2128214 A1 | 12/2009 |

(Continued)

OTHER PUBLICATIONS

International Search Report (ISR) dated Dec. 24, 2019 filed in PCT/JP2019/034289.  
(Continued)

*Primary Examiner* — Michael C Miggins  
(74) *Attorney, Agent, or Firm* — Rankin, Hill & Clark LLP

(57) ABSTRACT

The present invention is a liquid-repellent film or sheet that exhibits an excellent liquid repellency, and a packaging material using the same. The liquid-repellent film or sheet comprises:
- a substrate layer (2);
- an adhesive layer (3) that comprises a thermoplastic resin, and is formed on at least one plane of the substrate layer (2); and (Continued)

a liquid-repellent layer (4) that comprises a resin (6) having a liquid-repellent moiety, and hydrophilic particles (5), and is formed on the surface of the adhesive layer (3).

13 Claims, 8 Drawing Sheets

(51) Int. Cl.
*B32B 7/12* (2006.01)
*B32B 27/08* (2006.01)
*B32B 27/20* (2006.01)
*B32B 27/30* (2006.01)
*B32B 27/32* (2006.01)
*B32B 27/36* (2006.01)

(52) U.S. Cl.
CPC ............... *B32B 27/20* (2013.01); *B32B 27/30* (2013.01); *B32B 27/32* (2013.01); *B32B 27/36* (2013.01); *B32B 2250/02* (2013.01); *B32B 2250/24* (2013.01); *B32B 2255/10* (2013.01); *B32B 2255/26* (2013.01); *B32B 2264/1021* (2020.08); *B32B 2307/728* (2013.01); *B32B 2307/73* (2013.01); *B32B 2307/732* (2013.01); *B32B 2435/02* (2013.01); *B32B 2439/46* (2013.01); *B32B 2439/70* (2013.01); *B32B 2553/00* (2013.01)

(58) Field of Classification Search
CPC ..... B32B 27/32; B32B 27/36; B32B 2250/02; B32B 2250/24; B32B 2255/10; B32B 2255/26; B32B 2264/1021; B32B 2307/728; B32B 2307/73; B32B 2307/732; B32B 2435/02; B32B 2439/46; B32B 2439/70; B32B 2553/00

See application file for complete search history.

(56) References Cited

FOREIGN PATENT DOCUMENTS

| | | |
|---|---|---|
| EP | 3431284 A1 | 1/2019 |
| JP | 2001-88247 A | 4/2001 |
| JP | 2005-171100 A | 6/2005 |
| JP | 2008-39377 A | 2/2008 |
| JP | 2011-93315 A | 5/2011 |
| JP | 2011-140625 A | 7/2011 |
| JP | 2014-1294 A | 1/2014 |
| JP | 2016-166308 A | 9/2016 |
| JP | 2017-114106 A | 6/2017 |
| JP | 2017-160312 A | 9/2017 |
| JP | 2017-209874 A | 11/2017 |
| WO | 2016/039379 A1 | 3/2016 |
| WO | 2017/104612 A1 | 6/2017 |
| WO | 2017/159678 A1 | 9/2017 |
| WO | 2017/204258 A1 | 11/2017 |

OTHER PUBLICATIONS

Extended European Search Report (EESR) dated Jun. 20, 2022 for European Application No. 19865583.9.

* cited by examiner

FIG.5   SEM image of Example 1
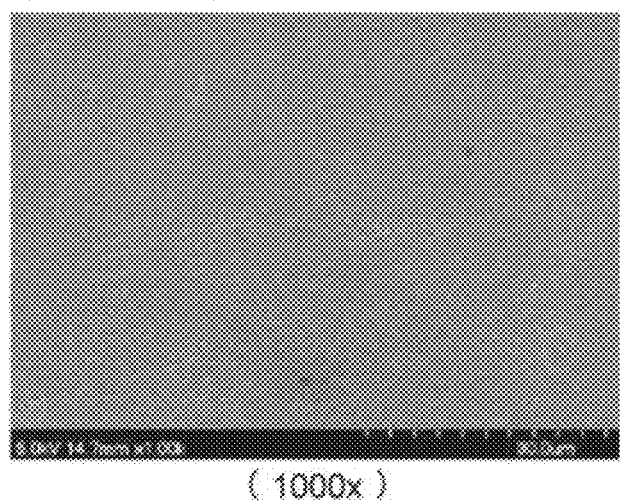
(1000x)
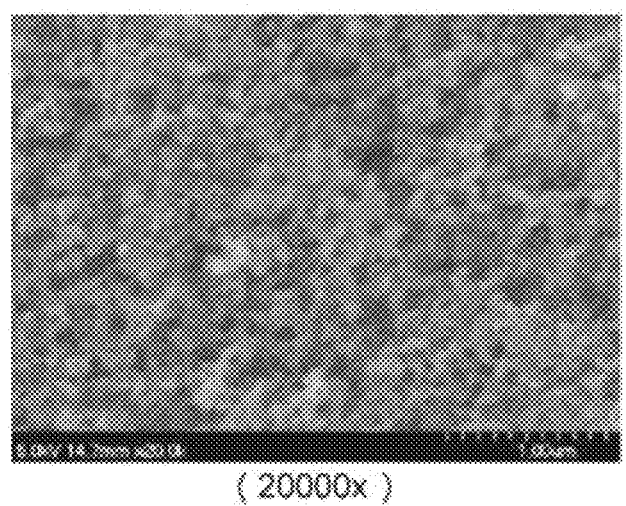
(2000x)

FIG. 6  SEM image of Example 2
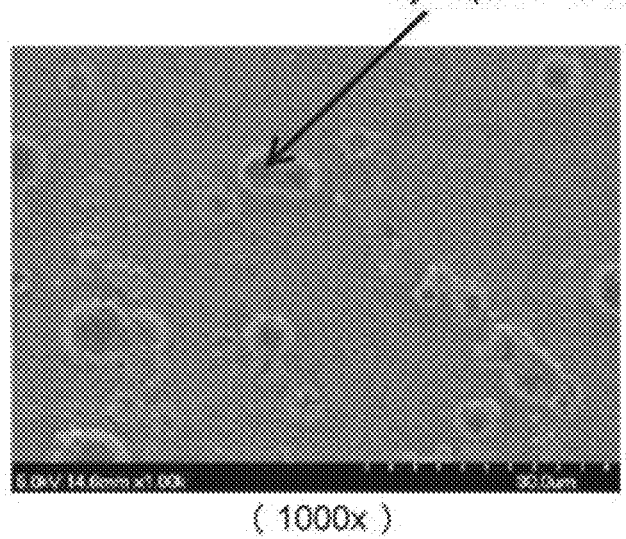
(1000x)
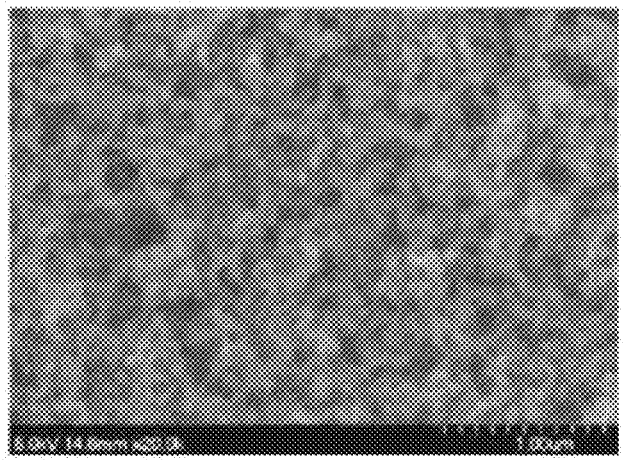
(20000x)
(Partically magnified image of hydrophilic silica beads)

FIG.7    SEM image of Example 4
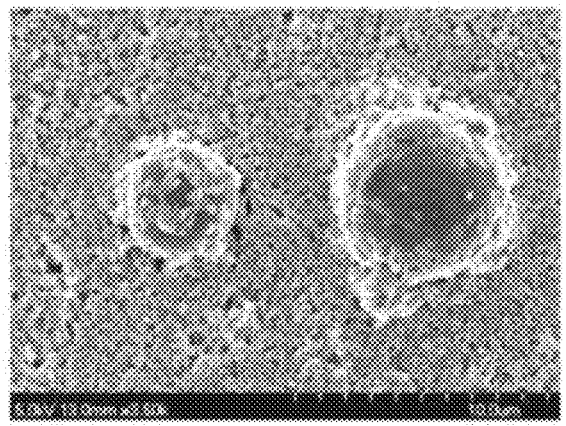
(3500x)
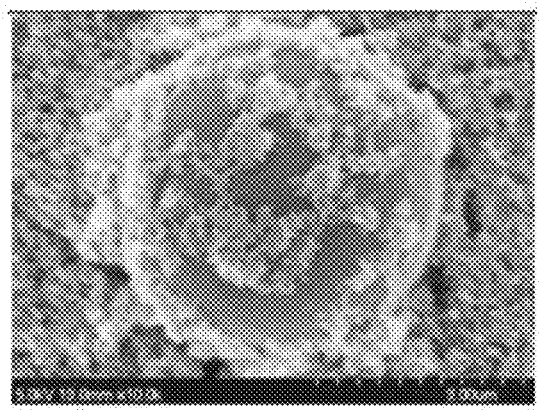
(10000x)
(Partically magnified image of hydrophilic silica beads)
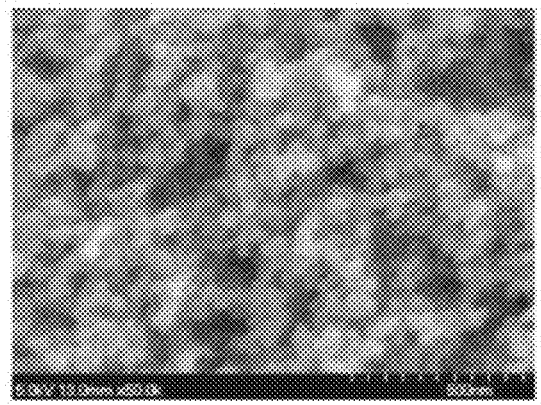
(50000x)

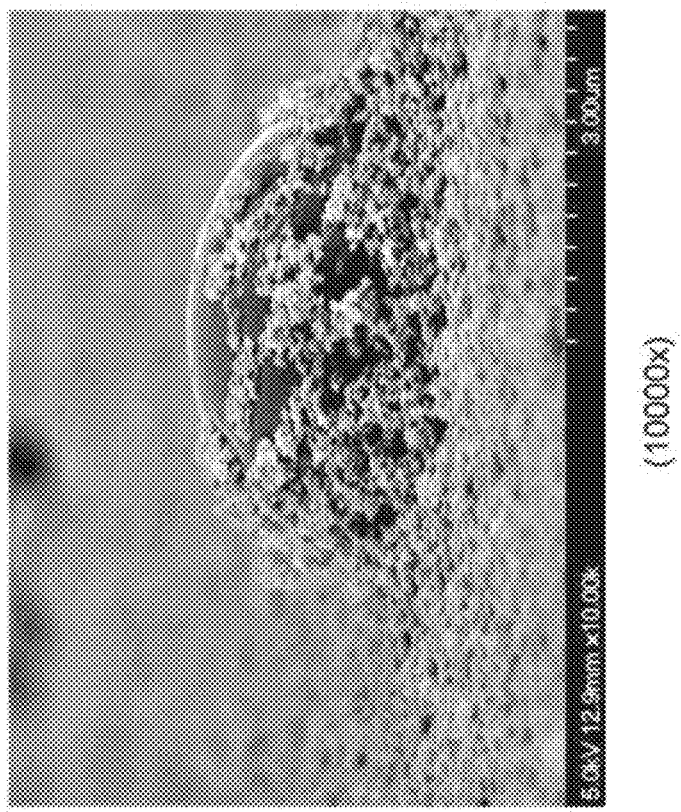
FIG. 8  SEM image of Example 5  (1000x)

FIG.9  Example 5
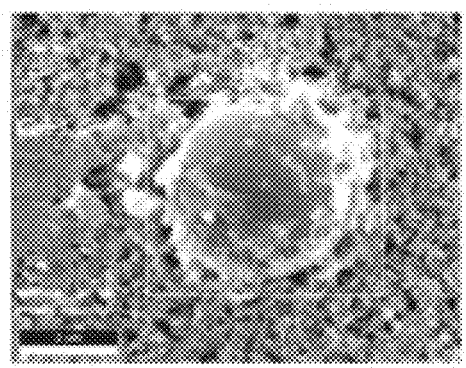
(A) SEM image
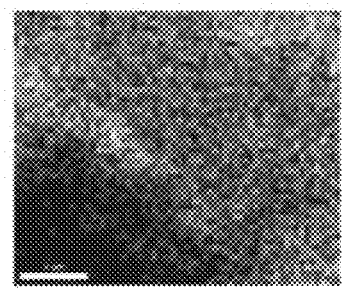
(B) Distribution of F-element
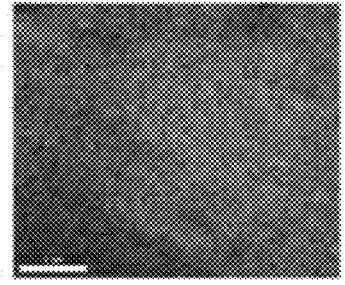
(C) Distribution of Si-element
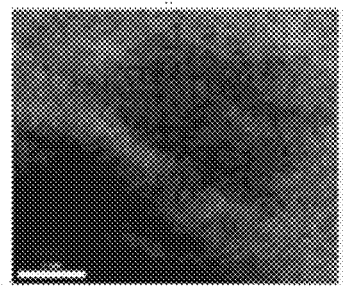
(D) Distribution of C-element

LIQUID REPELLENT FILM OR SHEET, AND PACKAGING MATERIAL, USING SAME

RELATED APPLICATIONS

This application claims the priority of Japanese Patent Application No. 2018-182147 filed on Sep. 27, 2018, the disclosure of which is incorporated herein by reference in its entirety.

FIELD OF THE INVENTION

The present invention relates to a film or a sheet that exhibits liquid repellency, and a packaging material using the same, and relates to those that are suitable for lids of packaging containers, pouches, cake packages, or the like.

BACKGROUND OF THE INVENTION

Various functions are demanded for films or sheets for packaging daily necessities such as food products, pharmaceuticals, cosmetics, household essentials, or the like, and particularly those which contents such as highly viscous liquids, semi-solids, and gel substances hardly adhere to, and hardly remain on the part in contact are strongly demanded. When films or sheets for packaging materials that are poor in adhesion preventability are used for food products that contain creams of cakes, yoghurts, puddings, jellies, syrups, and sources for Japanese dumplings, for example, as their contents, food products will be disposed in the state of adhering to/remaining on the films or sheets for packaging material; and problems of food waste, or problems of inhibiting promotion of recycling plastics arise. Moreover, when taking out the contents, there are also problems of dirtying hands, clothes, or other things nearby with the contents adhered to films or sheets for packaging. Furthermore, when films or sheets for packaging material are left with the remaining contents, various adverse effects such as occurrence of decay or odor, or gathering of insects may occur. The technique of reducing the amount of the contents adhering to films or sheets for packaging material as much as possible is very important.

It is described in Patent Literature 1, for example, that a polyolefin-based resin sheet is processed into protruding shapes, and a liquid-repellent coating is applied thereon to obtain a film or sheet for packaging material having adhesion preventability. Moreover, it is described that the contact angle or falling angle of water, vegetable oils, or hand soaps meets a certain standard.

CITATION LIST

Patent Literature

PATENT LITERATURE 1: International Publication No. 2016/039379

DISCLOSURE OF THE INVENTION

Problem to be Solved by the Invention

However, the invention of Patent Literature 1 has various problems such as: the production cost becomes high because an expensive equipment is used for making protruding shapes on the sheet; the sheet is limited to polyolefin-based resins having a good processability in order to form protruding shapes on the sheet; it cannot be used in applications using thin sheets because the thickness needs to be at least 50 μm in order to form protruding shapes; the sheet of the substrate is processed into relatively large protruding shapes of 20 μm or greater, so that light is easily scattered and becomes poor in transparency.

The object of the present invention is to provide a liquid-repellent film or sheet that exhibits an excellent liquid-repellency, and a packaging material using the same.

Means to Solve the Problem

A liquid-repellent film or sheet according to one embodiment of the present invention comprises:

a substrate layer;

an adhesive layer that comprises a thermoplastic resin, and is formed on at least one plane of the substrate layer; and a liquid-repellent layer that comprises a resin having a liquid-repellent moiety, and hydrophilic particles, and is formed on the surface of the adhesive layer.

According to this liquid-repellent film or sheet, the adhesive layer consisting of a resin composition comprising the thermoplastic resin is provided onto the plane of the substrate layer, and the liquid-repellent layer comprising the resin having the liquid-repellent moiety and the hydrophilic particles is provided onto the surface of the adhesive layer, so that liquid-repellency exhibited by the liquid-repellent layer is maintained. In particular, a minute uneven structure is formed on the surface of the adhesive layer by the numerous hydrophilic particles, and the resin having the liquid-repellent moiety such as a fluorine-based copolymer resin covers the uneven structure, so that the liquid-repellent layer can exhibit an excellent liquid-repellency.

Liquid-repellency as used herein indicates a property of exhibiting both of water-repellency and oil-repellency.

On the other hand, the adhesive layer may include hydrophilic silica particles. In this case, the hydrophilic particles of the liquid-repellent layer form the uneven structure on the surface of the hydrophilic silica particles of the adhesive layer, so that it becomes a large uneven structure as a whole; and thus liquid-repellency increases.

The minimum particle size of the hydrophilic silica particles of the adhesive layer may be greater than the maximum particle size of the hydrophilic particles of the liquid-repellent layer. In this case, the hydrophilic particles comprised in the liquid-repellent layer on the adhesive layer is smaller than the hydrophilic silica particles of the adhesive layer, so that the uneven structure formed by both particles becomes an uneven structure with steep protrusions and recesses as a whole; and thus liquid-repellency increases more. The hydrophilic silica particles of the adhesive layer may be porous.

In the liquid-repellent layer, the resin having the liquid-repellent moiety may be a copolymer including a liquid-repellent moiety and a hydrophilic moiety. Moreover, this copolymer may be a block copolymer. These configurations enable to provide a liquid-repellent film or sheet particularly suitable for preventing adhesion of O/W emulsions. Since the hydrophilic moiety of the copolymer resin that covers the hydrophilic particles attracts water of the continuous phase of the emulsion, breakdown of the micelle in the emulsion by contacting with the liquid-repellent layer can be prevented easily. Moreover, since the liquid-repellent moiety of the copolymer resin is present, the liquid-repellent layer can be easily prevented from becoming wet by the attracted water. In addition, when the liquid-repellent film or sheet is peeled off from the O/W emulsion or when the O/W emulsion is removed from the liquid-repellent film or sheet, adhesion of the O/W emulsion is prevented by the liquid-repellent moiety of the copolymer resin, so that the O/W emulsion hardly remains on the liquid-repellent film or sheet. In particular, even after the liquid-repellent film or sheet has been in contact with the O/W emulsion over a long time, preventability of adhesion of the O/W emulsion can be exhibited.

When an adhesion test of a cake-cream was performed with the liquid-repellent film of one embodiment, it was confirmed that condensation of dew occurred on the surface that was in contact with the cake-cream.

In the liquid-repellent layer, the hydrophilic particles may be silica microparticles. In this case, a liquid-repellent film or sheet having liquid repellency superior than with other hydrophilic particles can be provided.

Moreover, the average primary particle size of the hydrophilic particles may be 7 to 40 nm. In this case, the hydrophilic particles become suitably aggregated, and the resin having the liquid-repellent moiety becomes stored in the voids in the aggregated body; therefore, liquid-repellency increases more.

The ratio of the contents of the hydrophilic particles in the liquid-repellent layer and the resin having the liquid-repellent moiety may be 30:70% by mass to 70:30% by mass. In this case, when the ratio of the hydrophilic particles is less than 30% by mass, liquid-repellency becomes insufficient because the number of the minute protruding shapes of the liquid-repellent layer decreases; and when it exceeds 70% by mass, liquid repellency is more likely to deteriorate and the hydrophilic particles are more likely to fall off easily because the resin having the liquid-repellent moiety of the liquid-repellent layer cannot cover the hydrophilic particles completely, and the hydrophilic particles partially expose to the outermost surface.

The contact angle of when oleic acid comes into contact with the surface of the liquid-repellent layer may be 130 degrees or greater. In this case, a practical liquid repellency can be achieved.

A packaging material according to another embodiment of the present invention is obtained by using the above-identified liquid-repellent film or sheet. Moreover, a packaging container according to another embodiment of the present invention uses the above-identified film or sheet as a lid material. The above-identified film or sheet may be a film or sheet for a pouch. Moreover, the above-identified liquid-repellent film or sheet may be a film or sheet for packaging cakes.

Effect of the Invention

According to the present invention as described above, a liquid-repellent film or sheet that exhibits an excellent liquid-repellency and a packaging material using the same can be provided.

BRIEF DESCRIPTION OF DRAWINGS

FIG. 5 is 1000× and 20000× electron micrographs of the sample of Example 1.

FIG. 6 is 1000× and 20000× electron micrographs of the sample of Example 2.

FIG. 7 is 3500×, 10000× and 50000× electron micrographs of the sample of Example 4.

FIG. 8 is another electron micrograph of the sample of Example 5.

FIG. 9 (A) is an electron micrograph of the sample of Example 5, and (B) to (D) are images that show distribution of F-element, Si-element and C-element, respectively.

DESCRIPTION OF EMBODIMENTS

In the following, preferred embodiments of the present invention are described in detail with reference to the drawings.

Figure 1:
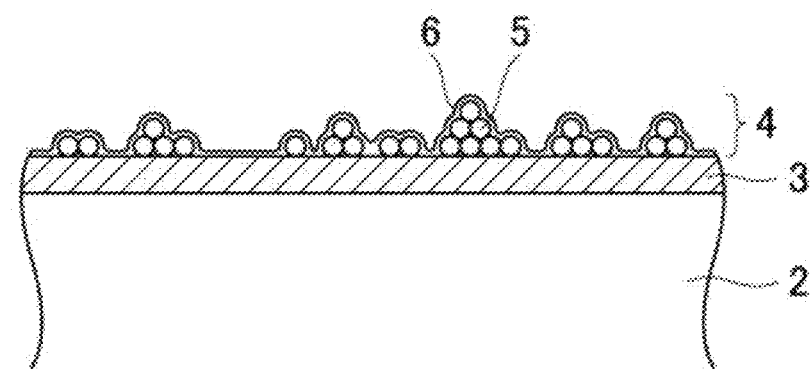
FIG. 1 is a schematic cross-sectional view of a liquid-repellent film according to a first embodiment.
Figure 1:
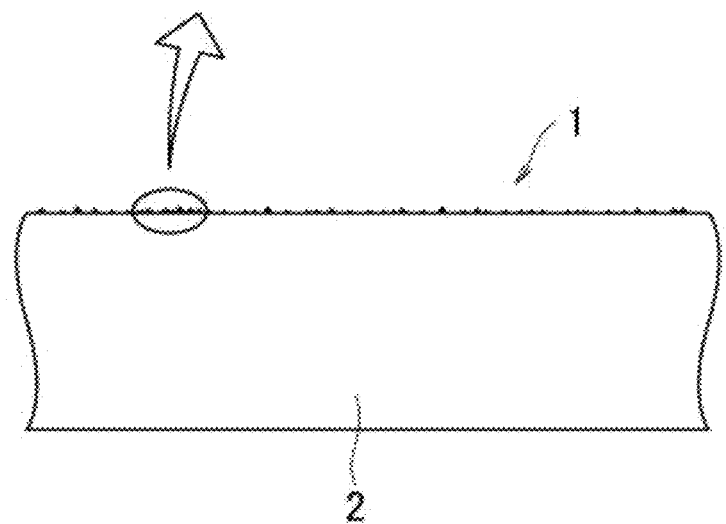

FIG. 1 is a schematic cross-sectional view of the liquid-repellent film according to the first embodiment. As shown in FIG. 1, the liquid-repellent film 1 comprises: a substrate layer 2; an adhesive layer 3 formed on one plane of this substrate layer 2; and a liquid-repellent layer 4 formed on the surface of this adhesive layer 3.

The substrate layer 2 is not particularly limited as long as it configures a substrate to be a support body, and it comprises at least one layer or more of a layer consisting of a film comprising a resin, paper, or a metal foil, for example. A resin film selected at least one from styrene-based resins, olefin-based resins, polyester-based resins, nylon-based resins, ethylene vinyl alcohol copolymers and acrylic resins is used as the film comprising the resin. When the substrate layer 2 is multi-layered, the laminating method is not particularly limited, and a dry laminate method, a wet laminate method, a heat laminate method, or the like can be used. Moreover, the substrate layer 2 may be processed with inorganic/metal-vapor deposition processing. The substrate layer 2 may be processed with printings. The printing method is not particularly limited, and well-known methods such as gravure printing, flexographic printing, screen printing, or the like can be used.

The thickness of the substrate layer 2 is not particularly limited. Thicknesses of about 1 to 200 μm as a film and about 200 to 10000 μm as a sheet are generally used.

The adhesive layer 3 consists of a resin composition comprising a thermoplastic resin. The thermoplastic resin is not particularly limited, and examples including polyester, polyolefin, polystyrene, nylon, polyvinyl chloride, polyvinylidene chloride, polyvinyl alcohol, an acrylonitrile-butadiene-styrene copolymer, an ethylene-vinyl acetate copolymer, polyacetal, polymethyl methacrylate, a methacrylic-styrene copolymer, cellulose acetate, polyurethane, polycarbonate, or the like may be used.

The thickness of the adhesive layer 3 is not particularly limited; however, it is preferably 0.5 to 1.5 μm.

The adhesive layer 3 is formed by applying an adhesive layer coating liquid, of which the thermoplastic resin is dissolved to or dispersed to a solvent, and drying. The solvent is not particularly limited as long as it can dissolve or disperse the thermoplastic resin. Examples thereof include: hydrocarbons such as n-hexane, cyclohexane, toluene, benzene, xylene, etc.; ketones such as acetone, methyl ethyl ketone (MEK), etc.; alcohols; or the like.

The liquid-repellent layer 4 is a layer having liquid repellency, and is formed to cover the surface of the adhesive layer 3. The liquid-repellent layer 4 is formed by applying a liquid-repellent layer coating liquid comprising hydrophilic particles 5 and a resin 6 having a liquid-repellent moiety to the surface of the adhesive layer 3, and drying. Examples of the hydrophilic particles 5 include hydrophilic oxide particles such as titanium oxide, zinc oxide, aluminum oxide (alumina), etc., and hydrophilic silica microparticles are particularly preferred among them.

The ratio of the hydrophilic particles 5 and the resin 6 having the liquid-repellent moiety is preferably 30:70% by mass to 70:30% by mass. When the ratio of the hydrophilic particles 5 is less than 30% by mass, liquid repellency deteriorates because the number of the minute protruding shapes of the liquid-repellent layer 4 is small. Whereas, when the ratio exceeds 70% by mass, liquid repellency is more likely to deteriorate and the hydrophilic particles 5 are more likely to fell off easily because the resin 6 having the liquid-repellent moiety of the liquid-repellent layer 4 cannot cover all the hydrophilic particles 5, and the hydrophilic particles 5 expose to the outermost surface.

Regarding the particle size of the hydrophilic particles 5, the average primary particle size is preferably 7 to 40 nm. The above-identified range of the average primary particle size enables to achieve an excellent liquid repellency because the hydrophilic particles 5 become suitably aggregated, and the resin 6 having the liquid-repellent moiety can be stored in the voids of the aggregated body.

The thickness of the liquid-repellent layer 4 is not particularly limited; however, it may be 0.1 to 1.5 µm. Regarding liquid repellency, the contact angle of when it comes into contact with oleic acid is preferably 130 degrees or greater. When it is less than 130 degrees, a practical liquid repellency cannot be achieved.

The liquid-repellent layer 4 is formed by applying a liquid-repellent layer coating liquid, of which the hydrophilic particles 5 and the resin 6 having the liquid-repellent moiety are dissolved or dispersed to the solvent, onto the adhesive layer 3, and drying. The solvent is not particularly limited as long as it can dissolve or disperse the hydrophilic particles 5 and the resin 6 having the liquid-repellent moiety. Examples thereof include water, alcohols such as ethanol, isopropyl alcohol (IPA), n-butyl alcohol, etc., or the like.

According to the liquid-repellent film 1 of the present embodiment, the adhesive layer 3 consisting of the resin composition comprising the thermoplastic resin is provided on the plane of the substrate layer 2, and the liquid-repellent layer 4 comprising the hydrophilic particles 5 and the resin 6 having the liquid-repellent moiety is provided onto the surface of the adhesive layer 3; therefore, liquid-repellency exhibited by the liquid-repellent layer 4 is maintained. In particular, a minute uneven structure is formed on the surface of the adhesive layer 3 by the numerous hydrophilic particles 5, and this uneven structure is covered by the resin 6 having the liquid-repellent moiety; therefore, the liquid-repellent layer 4 can exhibit an excellent liquid repellency.

Compared to the conventional manner of processing the olefin substrate into protruding shapes in advance, and applying a liquid-repellent coating liquid thereon, the manner of the present embodiment of providing the adhesive layer 3 on the substrate layer 2, and applying the liquid-repellent layer coating liquid thereon does not require an expensive equipment for processing the substrate layer 2 into protrusions, or a process of the same; therefore, cost can be reduced. In conventional liquid-repellent films, the substrate is limited to olefin resins having a good processability in order to form protruding shapes to the substrate. Whereas, in the liquid-repellent film 1 of the present embodiment, the substrate layer 2 of various types of resins can be used because the substrate does not need processing. Moreover, in conventional liquid-repellent films, liquid repellency of protruding shapes is not exhibited if protrusions of at least 20 µm or greater are not formed to the substrate; however, in the liquid-repellent film 1 of the present embodiment, the overall film thickness can be thinned because protruding shapes are not provided to the substrate layer 2.

Furthermore, in conventional liquid-repellent films, transparency deteriorates due to scattering of light because the substrate is processed to provide protruding shapes of 20 µm or greater. Whereas, in the liquid-repellent film 1 of the present embodiment, a high transparency is maintained because large protruding shapes are not present. Moreover, another factor of the high transparency of the liquid-repellent film 1 is that the number of voids in the liquid-repellent layer 4 is very small.

As described above, in the liquid-repellent film 1 of the present embodiment, improvement in transparency and reduce in cost can be achieved while a good liquid-repellency is maintained even if the substrate layer 2 is not processed into protruding shapes.

The liquid-repellent film 1 of the present embodiment is suitable for films or sheets for packaging materials of daily necessities. For example, the liquid-repellent film 1 of the present embodiment can be used as packaging materials for pouches that contain food products, cosmetics, detergents, shampoos, conditioners, etc., or packaging materials for lid materials of food containers such as yoghurts, puddings, jellies, etc. Moreover, the liquid-repellent film 1 of the present embodiment can be used as packaging materials for cakes with creams, or packaging materials for food products with viscous sauces such as Japanese dumplings.

Figure 2:
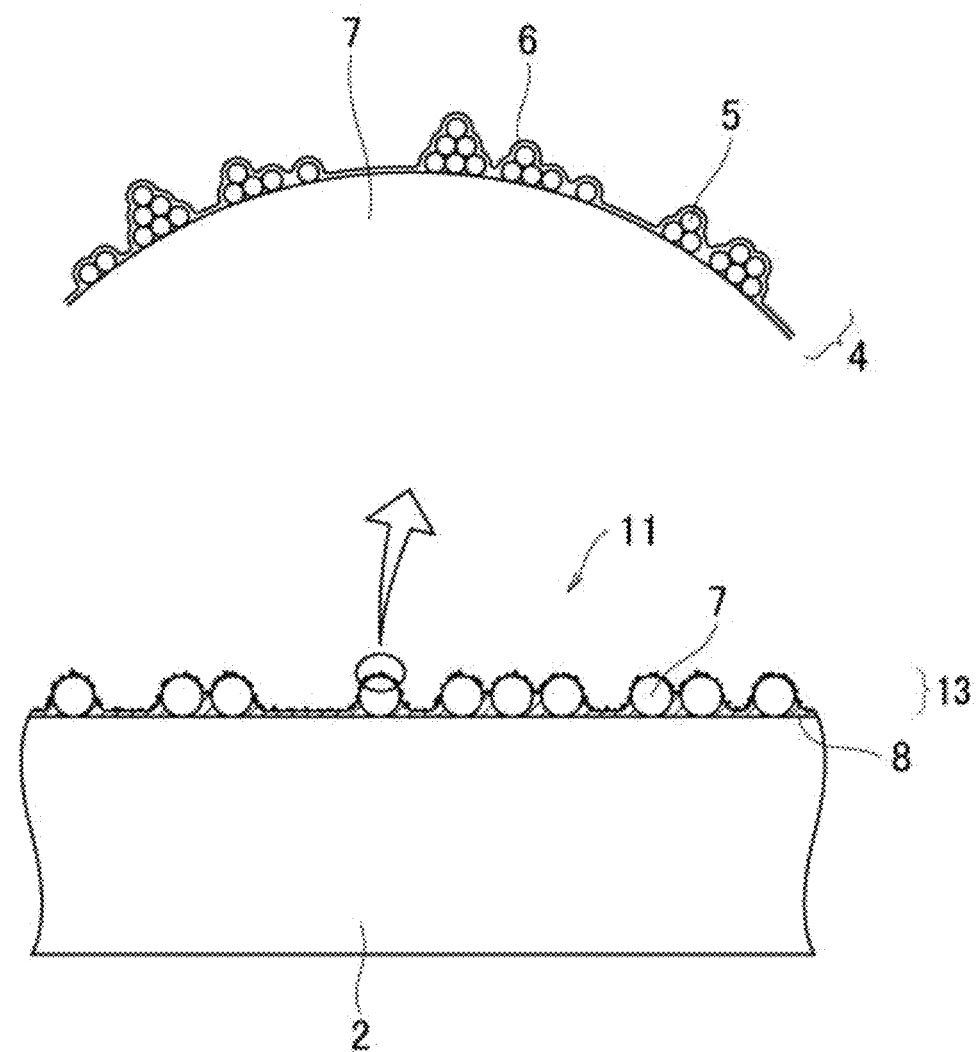
FIG. 2 is a schematic cross-sectional view of a liquid-repellent film according to a second embodiment.

FIG. 2 is a schematic cross-sectional view of the liquid-repellent film according to the second embodiment. As shown in FIG. 2, a liquid-repellent film 11 comprises: a substrate layer 2; an adhesive layer 13 formed on one plane of this substrate layer 2; and a liquid-repellent layer 4 formed on the surface of this adhesive layer 13.

The adhesive layer 13 is a resin composition comprising the same thermoplastic resin 8 as the first embodiment, and further comprises hydrophilic silica particles (also referred to as hydrophilic silica beads) 7. Examples of the hydrophilic particles 7 include crystalline silica, and amorphous silica (dry silica, wet silica, silica gel, etc.); however, it is not particularly limited and those that are well-known can be used suitably. The shape of the hydrophilic silica particle is not particularly limited, and various shapes such as a polyhedron, uneven shaped, or the like can be selected. Moreover, porous hydrophilic silica particles can be used.

The adhesive layer 13 is formed by applying an adhesive layer coating liquid, of which the hydrophilic silica particles 7 and the thermoplastic resin 8 are dissolved or dispersed to a solvent, to the substrate layer 2, and drying.

The thickness of the adhesive layer 13 is not particularly limited; however, it is smaller than the particle size of the hydrophilic silica particle 7 comprised to some extent. The hydrophilic silica particle 7 is not entirely buried in the thermoplastic resin 8, but a part of the hydrophilic particle 7 is exposed from the thermoplastic resin 8.

Regarding the particle sizes of the hydrophilic silica particles 7 of the adhesive layer 13 and the hydrophilic particles 5 of the liquid-repellent layer 4, the minimum particle size of the hydrophilic silica particles 7 is preferably greater than the maximum particle size of the hydrophilic particles 5. The minimum particle size of the hydrophilic silica particles 7 is 50 times or greater than the maximum particle size of the hydrophilic particles 5, for example, and preferably 150 times or greater. Since the particle size of the hydrophilic particles 5 comprised to the liquid-repellent layer 4 on the adhesive layer 13 is smaller than the hydrophilic silica particles 7 of the adhesive layer 13, the hydrophilic particles 5 form an uneven structure on the surface of the hydrophilic silica particles 7; therefore, it becomes an uneven structure with steep protrusions and recesses as a whole, and liquid repellency increases more.

In the liquid-repellent film 1 of the first embodiment, a demerit of not processing protruding shapes to the substrate layer 2 is that liquid repellency is slightly insufficient when there are only minute protruding shapes of the liquid-repellent layer 4. Accordingly, in the liquid-repellent film 11 of the present embodiment, the hydrophilic particles 5 are used instead of conventional hydrophobic oxide microparticles to improve liquid repellency. Furthermore, the hydrophilic silica particles 7 are added to the adhesive layer 13, and a large uneven structure having minute protruding shapes of the liquid-repellent layer 4 is formed to further improve liquid repellency. As a result, liquid repellency equivalent to that of when large protruding shapes are processed to the substrate in conventional films can be maintained.

In the liquid-repellent film 11 of the second embodiment, the resin 6 having the liquid-repellent moiety of the liquid-repellent layer 4 can be a copolymer of the liquid-repellent moiety and the hydrophilic moiety. In such configuration, a liquid-repellent film suitable for preventing adhesion of O/W emulsions such as liquid non-dairy creamers (coffee creamers) can be obtained preferably.

Figure 3:
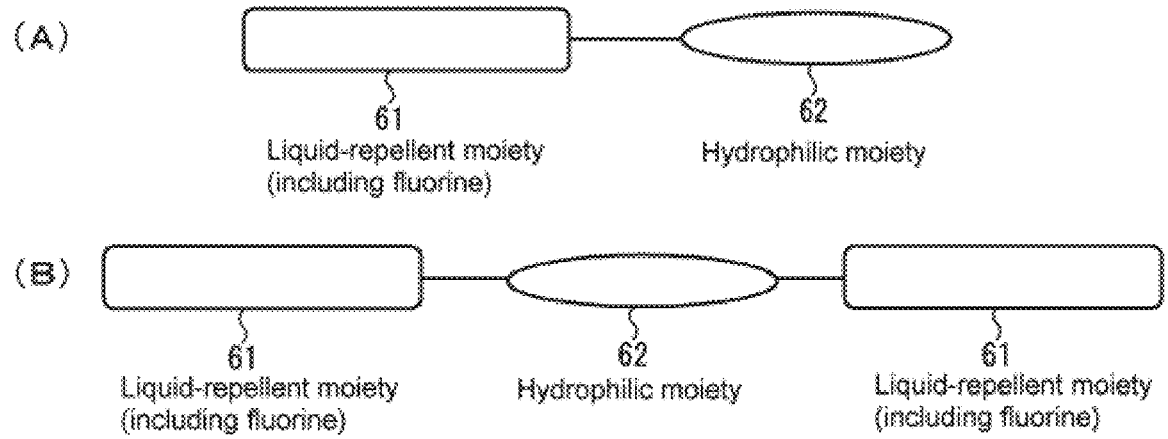
FIGS. 3 (A) and (B) are examples of structural views of fluorine-based copolymer resins used in the above-identified liquid repellent films.

FIG. 3 shows structures of the copolymer resin of the liquid-repellent moiety and the hydrophilic moiety of the liquid-repellent layer 4. FIG. 3(A) is a schematic structure of a block copolymer of a polymer 61 comprising the liquid-repellent moiety and a polymer 62 comprising the hydrophilic moiety. Liquid-repellent moieties (perfluoroalkyl groups, polyfluoroalkyl groups, perfluoropolyether groups, etc.) consisting of a fluorine resin are preferred as the liquid-repellent moiety; however, liquid-repellent moieties other than fluorine may also be used. Hydroxy groups, carboxyl groups, amino groups, oxyethylene groups or the like can be used as the hydrophilic moiety. When such block copolymer covers the hydrophilic particles, surface orientation of the copolymer 61 comprising the liquid-repellent moiety occurs from the relationship of its surface free energy under an air atmosphere. The copolymer 62 comprising the hydrophilic moiety has a high affinity for hydrophilic particles (silica particles or the like) having surface hydrophilicity such as silanol groups, and is useful for bonding the block copolymer and the hydrophilic particle. In particular, a tri-block copolymer of "liquid-repellent moiety (61)"-"hydrophilic moiety (62)"-"liquid-repellent moiety (61)" as shown in FIG. 3(B) is preferred.

Here, among the liquid-repellent moieties configuring the copolymer resin of the liquid-repellent moiety and the hydrophilic moiety that can be adopted to the liquid-repellent film 11 of the present embodiment, examples that comprise fluorine resins are listed in the following formula (formula 1).

[Formula 1]

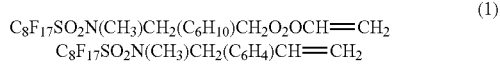
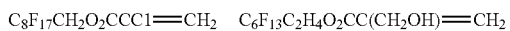

(1)

-continued

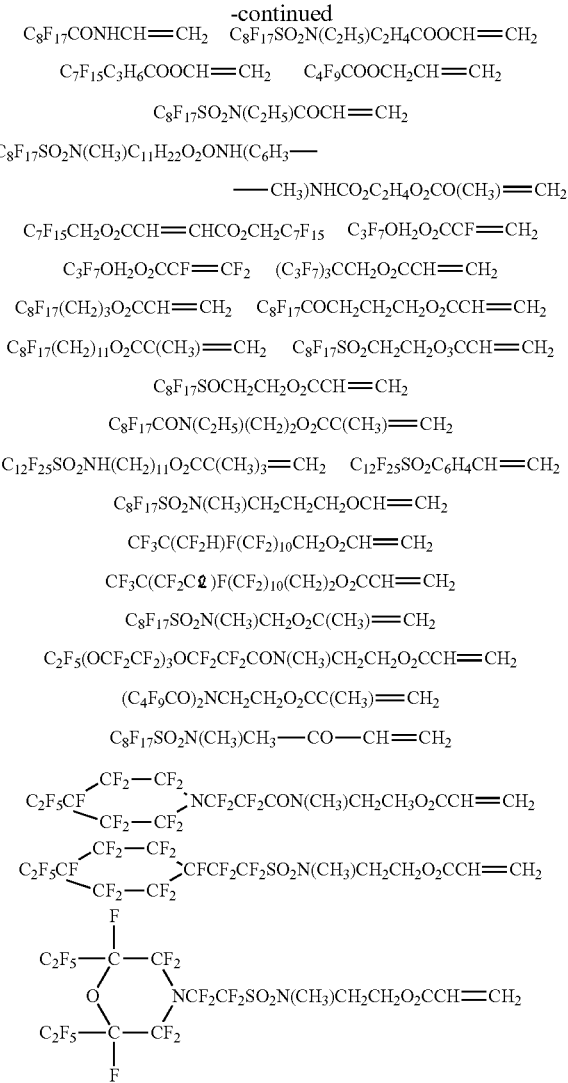

Moreover, examples of the hydrophilic moieties configuring the copolymer resin of the liquid-repellent moiety and the hydrophilic moiety that can be adopted to the liquid-repellent film 11 of the present embodiment are listed in the following formula (Formula 2).

[Formula 2]

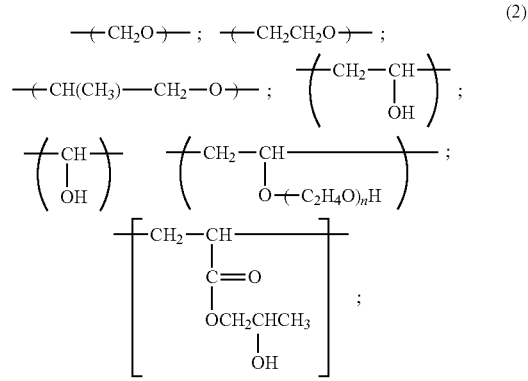

(2)

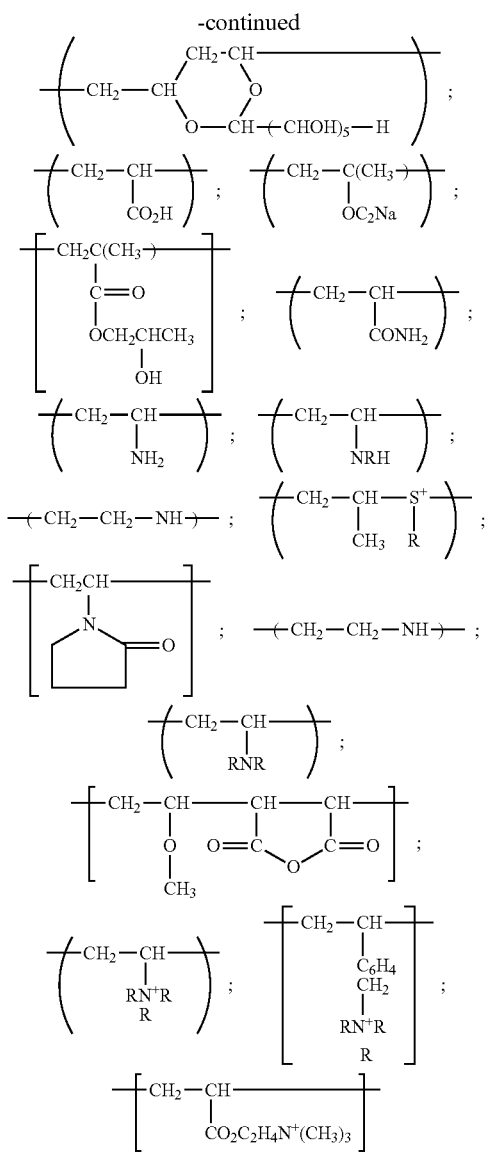

In the formula, R is hydrogen or desirably not more than six of an alkyl group. n is an integer.

Figure 4:
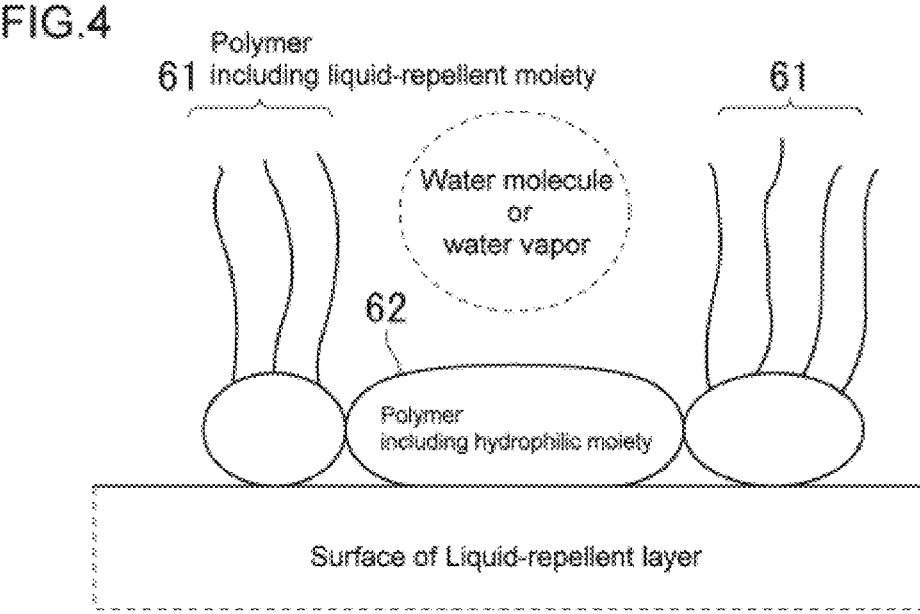
FIG. 4 schematically shows the surface of the liquid-repellent layer of the above-identified liquid-repellent film.

Adhesion preventability of the liquid-repellent film 11 to a liquid non-dairy creamer of the present embodiment is described with FIG. 4. FIG. 4 schematically shows the surface of the liquid-repellent layer of the liquid-repellent film 11. The polymer 61 including the liquid-repellent moiety of the liquid-repellent layer 4 is presumed to be oriented toward the outside, and the polymer 62 including the hydrophilic moiety is presumed to be oriented toward the side of the hydrophilic particle 5 (or the hydrophilic silica particle 7). Since the hydrophilic moiety attracts water (or water vapor) that is a continuous phase of the liquid non-dairy creamer, breakdown of the micelle in the liquid non-dairy creamer by contacting with the liquid-repellent layer can be prevented easily. Moreover, since the polymer 61 including the liquid-repellent moiety is present in the copolymer resin 6, the liquid-repellent layer 4 can be easily prevented from becoming wet by the attracted water. In addition, when the liquid non-dairy creamer is removed from the liquid-repellent film 11, it is considered that adhesion of the liquid non-dairy creamer is prevented by the presence of the polymer 61 including the liquid-repellent moiety of the copolymer resin 6, and thus the liquid non-dairy creamer hardly remains on the liquid-repellent film 11. In particular, even after the liquid-repellent film 11 has been in contact with the liquid non-dairy creamer over a long time, preventability of adhesion to the liquid non-dairy creamer is exhibited.

If the copolymer resin 6 of the liquid-repellent film 11 of the present embodiment consists of the liquid-repellent moieties, affinity for the liquid-repellent moiety becomes higher for the micelle than water, and the micelle is more likely to come into contact with the liquid-repellent layer. In such case, it is considered that the micelle collapses, and preventability of adhesion to the liquid non-dairy creamer deteriorates. Whereas, by using the copolymer of the liquid-repellent moiety and the hydrophilic moiety, particularly the block copolymer of the polymer 61 comprising the liquid-repellent moiety and the polymer 62 comprising the hydrophilic moiety, as the copolymer resin 6 of the liquid-repellent layer 4, the hydrophilic moiety thereof attracts water that is the continuous phase of the O/W emulsion such as liquid non-dairy creamers, and the possibility of the micelle to come into contact with the liquid-repellent layer may be lowered. As a result, a liquid-repellent film having an excellent adhesion preventability to O/W emulsions can be obtained.

Or, when the liquid-repellent layer comes into contact with the liquid non-dairy creamer, the polymer including the hydrophilic moiety becomes oriented toward the side of the liquid non-dairy creamer by "Flip-Flop phenomenon" that occurs in the block copolymer including the liquid-repellent moiety and the hydrophilic moiety, so that the hydrophilic moiety is considered to attract water that is the continuous phase of the liquid non-dairy creamer.

In any case, as the result of using the copolymer including the liquid-repellent moiety and the hydrophilic moiety as the copolymer resin 6 of the liquid-repellent layer, the liquid-repellent film having an excellent adhesion preventability to O/W emulsions was obtained.

The liquid-repellent film 11 of the second embodiment achieved effects similar to those described for the liquid-repellent film 1 of the first embodiment; however, descriptions are omitted.

EXAMPLES

The present invention is described in further details with the following examples; however, the present invention is not limited to these examples.

Example 1

Polyethylene terephthalate (PET; thickness: 12 μm) was used as the substrate. The film surface of the substrate was processed with an easily-adhesive coating in advance to provide the adhesive layer. In the liquid-repellent layer, commercially available hydrophilic fumed silica microparticles having the average primary particle size of 12 nm were used as the hydrophilic particles, a fluorine-based copolymer resin was used as the copolymer resin having the liquid-repellent moiety and the hydrophilic moiety, and a solvent was formulated in accordance with Table 1. The liquid-repellent layer coating liquid A(1) of Table 1 was applied onto the substrate at a thickness of 0.7 g/m², and dried at 100° C. for about two seconds to prepare a sample.

TABLE 1

| Liquid-repellent layer coating liquid A(1) | | |
|---|---|---|
| Hydrophilic silica microparticles Particle size: 12 nm | Fluorine-based copolymer resin | Solvent |
| Coating material (% by mass) 5 | 5 | 90 |

Example 2

Polyethylene terephthalate (thickness: 50 μm) was used as the substrate. An adhesive layer coating liquid B(1) was prepared in accordance with the formulation of Table 2. Commercially available hydrophilic silica beads having the particle size of 3 μm were used. The application amount of the adhesive layer was 1.3 g/m².

Others including the liquid-repellent layer were prepared in the same manner as in Example 1, and a sample having the liquid-repellent layer formed on the surface of the adhesive layer was prepared.

TABLE 2

| Adhesive layer coating liquid B(1) | | |
|---|---|---|
| Hydrophilic silica beads Particle size: 3 μm | Thermoplastic resin (Polyester-based) | Solvent |
| Coating material (% by mass) 8.6 | 14.3 | 77.1 |

Example 3

Polypropylene (PP, thickness: 60 μm) was used as the substrate. An adhesive layer coating liquid B(2) was prepared in accordance with the formulation of Table 3. The application amount of the adhesive layer was 1.2 g/m².

Others including the liquid-repellent layer were prepared in the same manner as in Example 1, and a sample having the liquid-repellent layer formed on the surface of the adhesive layer was prepared.

TABLE 3

| Adhesive layer coating liquid B(2) | | |
|---|---|---|
| Hydrophilic silica beads Particle size: 3 μm | Thermoplastic resin (Chlorinated polyolefin-based) | Solvent |
| Coating material (% by mass) 6 | 10 | 8.4 |

Example 4

Polypropylene (thickness: 20 μm) was used as the substrate. The adhesive layer was formed with the same adhesive layer coating liquid B(2) as Example 3 at an application amount of 0.8 g/m². Moreover, a liquid-repellent layer coating liquid equivalent to the liquid-repellent layer coating liquid A(1) of Example 1 was applied to the surface of the adhesive layer at a thickness of 0.8 g/m² to prepare a sample in the same manner as in Example 1.

Example 5

Polypropylene (thickness: 40 μm) was used as the substrate. The adhesive layer was formed with the same adhesive layer coating liquid B(2) as Example 3 at an application amount of 1.1 g/m². Moreover, a liquid-repellent layer coating liquid equivalent to the liquid-repellent layer coating liquid A(1) of Example 1 was applied to the surface of the adhesive layer at a thickness of 0.6 g/m² to prepare a sample in the same manner as in Example 1.

Comparative Example 1

Other than the hydrophilic particles of the liquid-repellent layer were changed to a commercially available hydrophobic silica microparticles (average primary particle size: 12 nm), a sample was prepared in the same manner as in Example 1. The liquid-repellent layer coating liquid A(2) was prepared in accordance with the formulation of Table 4. However, the application amount of the liquid-repellent layer coating liquid A(2) was 0.4 g/m².

TABLE 4

| Liquid-repellent layer coating liquid A(2) | | |
|---|---|---|
| Hydrophobic silica microparticles Particle size: 12 nm | Fluorine-based copolymer resin | Solvent |
| Coating material (% by mass) 5 | 5 | 90 |

Comparative Example 2

Polypropylene (thickness: 500 μm) was used as the substrate, and protruding shapes having heights of 89 μm were provided to the substrate. The liquid-repellent layer coating liquid A(3) was prepared in accordance with the formulation of Table 5. The liquid-repellent layer coating liquid A(3) was applied onto the substrate at a thickness of 0.7 g/m², and dried at 100° C. for about two seconds to prepare a sample.

TABLE 5

| Liquid-repellent layer coating liquid A(3) | | |
|---|---|---|
| Hydrophobic silica microparticle Particle size: 7 nm | Fluorine-based copolymer resin | Solvent |
| Coating material (% by mass) 4.1 | 2.1 | 93.8 |

<Evaluation Method>

The samples of Examples 1 to 3 and Comparative examples 1 and 2 were tested by the following methods to be evaluated.

(1) Contact angle of water: 10 μL of pure water was put onto the liquid-repellent film, and the contact angle of water was measured with a contact angle meter CA-DT (manufactured by Kyowa Interface Science Co., Ltd.).

(2) Contact angle of oil: 10 μL of oleic acid was put onto the liquid-repellent film, and the contact angle of oil was measured with a contact angle meter CA-DT (manufactured by Kyowa Interface Science Co., Ltd.).

(3) Transparency: A turbidity (haze value) of the liquid-repellent film was measured with a haze meter "NDH-5000" (manufactured by NIPPON DENSHOKU INDUSTRIES CO., LTD.). Moreover, a turbidity (haze value) of the substrate alone was measured similarly.

Moreover, the surfaces of the samples of Examples 1, 2, 4 and 5 were subjected to the following.

(4) Electron microscopic observation

Example 5 was subjected to the following.

(5) Elementary analysis by energy dispersive X-ray analysis (EDX)

Furthermore, the samples of Examples 1 to 3, and 5 and Comparative examples 1 and 2 were subjected to the following measurement.

(6) Adhesion amount of the liquid non-dairy creamer:

The lid of a container (φ30 mm cup) of a commercially available liquid non-dairy creamer was pulled off, and the sample of which its weight was measured in advance was placed thereon. Then, the container was turned upside down to make the liquid non-dairy creamer to come into contact with the sample to stand still. The container was turned upside down after one minute, and the sample was pulled off to measure the weight of the sample. The difference between the weights of the sample before and after contact with the liquid non-dairy creamer was defined as the adhesion amount of the liquid non-dairy creamer. The physical properties of the liquid non-dairy creamer are as follows: the surface tension value at 22° C. is 35 to 38 mN/m; and the viscosity is 10 to 50 mPa·s. The surface tension value was measured by a surface tension meter CBVP-Z (manufactured by Kyowa Interface Science Co., Ltd.). Moreover, the viscosity was measured by a B-type viscometer 6/R (manufactured by Thermo Fisher Scientific K.K.).

TABLE 6

| | Contact angle of water (degrees) [ ]: substrate alone | Contact angle of oil (degrees) | Transparency haze (%) Liquid-repellent film | Transparency haze (%) Substrate alone |
|---|---|---|---|---|
| Example 1 | 154 [67] | 133 | 13.3 | 5.8 |
| Example 2 | 153 [63] | 135 | 29.9 | 4.0 |
| Example 3 | 156 [57] | 137 | 31.7 | 2.4 |
| Comparative example 1 | 135 [67] | 97 | 13.2 | 5.8 |
| Comparative example 2 | 157 [—] | 140 | 74.5 | — |

Table 6 shows that the liquid-repellent film of Example 1 had the haze value of 13.3%, and was almost transparent. The contact angle of water was 154 degrees, and the contact angle of oil was 133 degrees; therefore, a sufficient liquid-repellency was secured.

In the liquid-repellent film of Example 2, the contact angle of water was 153 degrees, and the contact angle of oil was 135 degrees; therefore, improvement in liquid-repellency was secured by addition of the hydrophilic silica beads to the adhesive layer. Although the haze value was 29.9% and slightly deteriorated, a necessary transparency was also secured.

Although the substrate was changed to polypropylene in the liquid-repellent film of Example 3, liquid-repellency and transparency almost equivalent to those of Example 2 were secured.

On the other hand, since the hydrophobic silica microparticles were added to the liquid-repellent layer instead of the hydrophilic silica microparticles in the film of Comparative example 1, the contact angle of water was 135 degrees and the contact angle of oil was 97 degrees; therefore, liquid-repellency greatly deteriorated, and it cannot be used as liquid-repellent applications.

The liquid-repellent film of Comparative example 2 achieved good results: the contact angle of water of 157 degrees, and the contact angle of oil of 140 degrees; however, the haze value was 74.5% and deteriorated. Therefore, it cannot be used in applications that require transparency.

The electron micrograph (1000×) of Example 1 in FIG. 5 shows that the surface is smooth. Moreover, the magnified electron micrograph (20000×) in FIG. 5 shows that a minute uneven structure is formed by the numerous hydrophilic silica microparticles.

In the electron micrograph (1000×) of Example 2 in FIG. 6, since the adhesive layer comprises the hydrophilic silica beads, a large protruding structure formed by the hydrophilic silica beads can be seen on the surface. Moreover, in the magnified electron micrograph (20000×) of the hydrophilic silica beads part in FIG. 6, a minute uneven structure formed by the numerous hydrophilic silica microparticles can be seen on the surfaces of the hydrophilic silica beads. Accordingly, in Example 2, a smaller uneven structure can be confirmed on the large protruding structure, and it can be seen that a minute uneven structure with steep protrusions and recesses is formed as a whole.

FIG. 7 is the highly-magnified electron micrograph of the sample of Example 4. The adhesive layer is formed such that the surfaces of the hydrophilic silica beads that are scattered on the surface of the substrate and has the particle size of 3 μm are hemispherically exposed. The hydrophilic silica microparticles having the particle size of 12 nm partially cover the surfaces of the silica beads to form a minute uneven structure. A part of the surface of the silica beads is not covered with the hydrophilic silica microparticles.

FIG. 8 is the electron micrograph of which the surface of the sample of Example 5 is observed obliquely from above. The shape of the hydrophilic silica bead can be seen three-dimensionally. The hydrophilic silica bead has many aggregations of the silica microparticles in the lower part, and less aggregations of the silica microparticles on the top. By burying about 30% of the hydrophilic silica bead, adhesion of the hydrophilic silica bead is maintained. Since the particle size of the beads is relatively small in the present invention, scattering of light hardly occurs, and a high transparency can be achieved.

FIG. 9 is the electron micrograph of the sample of Example 5, and the distribution images of each element. FIG. 9(B) to (D) are the distribution images (EDX) of F-element, Si-element, and C-element in the white frame (hydrophilic silica bead part) of the electron micrograph of FIG. 9(A). The target elements are largely distributed in the bright parts of the distribution images.

According to the electron micrograph of FIG. 9(A), it shows that the surface of the silica bead is partially covered with the hydrophilic silica microparticles, and a part of the surface of the silica bead is not covered with the microparticles. On the other hand, according to the distribution image of F-element of FIG. 9(B), fluorine elements were observed from the parts where the microparticles were not adhered to. The characteristic feature of the liquid-repellent film of the present invention is that fluorine-based resin is largely distributed to the parts of the surface of the hydrophilic silica beads where the silica microparticles are not adhered to. It is considered that such distribution of fluorine-based resin is the reason of the excellent liquid-repellency.

Moreover, according to the distribution image of C-element of FIG. 9(D), it can be seen that C-elements were largely distributed around the silica bead. It can be said that the C-element represents the thermoplastic resin that is a binder, and the silica bead is strongly fixed by the thermoplastic resin.

Table 7 shows the adhesion amounts of the liquid non-dairy creamers of each sample. In particular, it can be seen that the samples of Examples 2, 3, and 5 achieved a significantly excellent adhesion preventability to O/W emulsions equivalent to that of Comparative example 2. Moreover, it can be seen that the sample of Example 1 achieved adhesion preventability equivalent to or greater than that of Comparative example 1, although poorer than that of Comparative example 2.

TABLE 7

| | Adhesion amount of liquid non-dairy creamers (g) | | | |
|---|---|---|---|---|
| | 1 | 2 | 3 | Average |
| Example 1 | 0.0489 | 0.0445 | 0.0446 | 0.0460 |
| Example 2 | 0.0013 | 0.0001 | 0.0015 | 0.0010 |
| Example 3 | 0.0031 | −0.0005 | 0.0016 | 0.0014 |
| Example 5 | 0.0009 | 0.0007 | 0.0005 | 0.0007 |
| Comparative example 1 | 0.0530 | 0.0545 | 0.0736 | 0.0604 |
| Comparative example 2 | 0.0004 | 0.0007 | 0.0001 | 0.0004 |

The measurement value of the contact angle of 10 μL of the liquid non-dairy creamer to the sample of Example 5 is shown in Table 8. When compared to the polypropylene film of the substrate alone of Example 5 to which neither the adhesive layer nor the liquid-repellent layer was applied to, the difference between the measurement value of Example 5 and the measurement value of the substrate alone became apparent, and it is found that a good liquid-repellency to liquid non-dairy creamers is achieved.

TABLE 8

| | Liquid non-dairy creamer Contact angle (degrees) |
|---|---|
| Example 5 | 142 |
| Substrate alone of Example 5 | 48 |

<Cream Adhesion Test>

Next, the samples were tested by the following methods, and evaluated.

(A) Cream adhesion test: A commercially available frozen whipped-cream sponge cake was defrosted at room temperature. The samples of Examples 1 to 3 (size: 55 mm×70 mm) were adhered to the circumference of the cake, and stored in a refrigerator for 72 hours to measure the adhesion amount. The weights of the samples before and after adhering to the circumference of the cake were measured, and the differences thereof were defined as the adhesion amounts. The measurement results are shown in Table 9.

(B) Cream adhesion test: 3 g of a cream was placed onto an acrylic plate, and was lidded with the samples of Examples 4 and 5 (size: 60 mm×60 mm) to measure the adhesion amounts after 10 minutes. The measurement results are shown in Table 10.

By comparing to the results of the unprocessed substrate alone, it was found that adhesion of the cream to the sample could be reduced in either cream adhesion tests. In particular, it was found that the adhesion amounts to the samples of Examples 2 to 5 of which the silica beads were comprised to the adhesive layer were remarkably reduced.

TABLE 9

| | Cream adhesion test A Cake cream (g/sample) |
|---|---|
| Example 1 | 0.0093 |
| Example 2 | 0.0027 |
| Example 3 | 0.0045 |
| Substrate alone | 0.4022 |

TABLE 10

| | Cream adhesion test B Animal-derived crew (g/sample) |
|---|---|
| Example 4 | 0.044 |
| Example 5 | 0.103 |
| Substrate alone | 0.687 |

REFERENCE SIGNS LIST 1, 11 Liquid-repellent film
2 Substrate layer
3, 13 Adhesive layer
4 Liquid-repellent layer
5 Hydrophilic particle
6 Resin having liquid-repellent moiety
7 Hydrophilic silica particle
8 Thermoplastic resin
61 Polymer including liquid-repellent moiety
62 Polymer including hydrophilic moiety

What is claimed is:

1. A liquid-repellent film or sheet comprising:
a substrate layer;
an adhesive layer that comprises a thermoplastic resin and hydrophilic silica particles, and is formed on one plane of the substrate layer; and
a liquid-repellent layer that comprises a resin having a liquid-repellent moiety, and hydrophilic particles, and is formed on a surface of the adhesive layer.

2. The liquid-repellent film or sheet of claim 1, wherein the minimum particle size of the hydrophilic silica particles of the adhesive layer is greater than the maximum particle size of the hydrophilic particles of the liquid-repellent layer.

3. The liquid-repellent film or sheet of claim 1, wherein the hydrophilic particles are silica microparticles.

4. The liquid-repellent film or sheet of claim 1, wherein the average primary particle size of the hydrophilic particles is 7 to 40 nm.

5. The liquid-repellent film or sheet of claim 1, wherein the ratio of the contents of the hydrophilic particles in the liquid-repellent layer and the resin having the liquid-repellent moiety is 30:70% by mass to 70:30% by mass.

6. The liquid-repellent film or sheet of claim 1, wherein the contact angle of when oleic acid comes into contact with the surface of the liquid-repellent layer is 130 degrees or greater.

7. The liquid-repellent film or sheet of claim 1, wherein the resin having the liquid-repellent moiety is a copolymer including a liquid-repellent moiety and a hydrophilic moiety.

8. The liquid-repellent film or sheet of claim 7, wherein the copolymer is a block copolymer.

9. The liquid-repellent film or sheet of claim 8 that is suitable for preventing adhesion of O/W emulsion.

10. A packaging material obtained by using the liquid-repellent film or sheet of claim 1.

11. A packaging container that uses the liquid-repellent film or sheet of claim 1 as a lid material thereof.

12. The liquid-repellent film or sheet of claim 1, wherein the liquid-repellent film or sheet is a film or sheet for a pouch.

13. The liquid-repellent film or sheet of claim 1, wherein the liquid-repellent film or sheet is a film or sheet for packaging cakes.

\* \* \* \* \*